Patented June 17, 1952

2,600,399

UNITED STATES PATENT OFFICE 2,600,399

CATALYTIC REDUCTION OF CARBON MONOXIDE WITH HYDROGEN

Walter G. Frankenburg, Millersville, Pa., and Edwin T. Layng, New York, N. Y., assignors to Hydrocarbon Research, Inc., New York, N. Y., a corporation of New Jersey No Drawing. Application July 11, 1947, Serial No. 760,498

12 Claims. (Cl. 260—449.6)

The present invention relates to the synthesis of hydrocarbons, oxygenated hydrocarbons, and the like by the catalytic reduction of carbon monoxide with hydrogen.

More particularly, the present invention contemplates the catalytic manufacture of hydrocarbons, particularly normally liquid hydrocarbons, in the presence of an iron catalyst at elevated temperatures, usually in the range of about 500 to 750° F., and preferably under elevated pressures.

As hitherto proposed, the process is usually accompanied by an objectionable production of by-product carbon dioxide. The present invention contemplates the control of carbon dioxide formation so that the carbon monoxide in the feed is consumed essentially in the formation of the desired products, and contemplates also the controlled conversion of carbon dioxide into useful products.

The present invention is a continuation-in-part of our co-pending application, Serial No. 721,538, filed January 11, 1947 now Patent 2,510,096, issued June 6, 1950.

In carrying out the present invention, a stream of reactant feed gas containing carbon monoxide, hydrogen and carbon dioxide is passed in contact with an iron catalyst under reaction conditions such that at least about 80% or more of the carbon monoxide present in the total feed gas is consumed upon passage through the catalyst.

We have discovered that when the total reactant mixture passing in contact with the catalyst at appropriate reaction temperature contains hydrogen, carbon monoxide, and carbon dioxide in properly regulated proportions, the net production of carbon dioxide in the process is limited to an economical and commercially practical level. We have also discovered that it is possible, by this regulation to cause actual consumption of carbon dioxide in the reaction. Our invention resides in reacting feed gas of predetermined composition and at predetermined temperature effective to control carbon dioxide formation as above.

The total feed gas supplied to the reaction zone most advantageously contains as small a concentration of water vapor as possible. While a gas free from water vapor is ideal, as a practical matter the lower limit is usually determined by the degree of separation commercially practicable when condensing and separating at temperatures and pressures economically available. Accordingly, the present invention particularly contemplates the use of feed gases wherein the amount of water vapor is very minor, lower, in any event, than about 2 mol per cent, based on the total mols of hydrogen, carbon monoxide and carbon dioxide, such minor amount being comprehended within the term "substantially free of water vapor," as used herein.

More specifically, the invention contemplates use of feed gas compositions for which the ratio A of the mols of hydrogen to the mols of carbon monoxide in the feed to the reactor, the ratio G of the mols of carbon dioxide to the mols of carbon monoxide in the feed to the reactor, and finally the absolute temperature T of the synthesis reaction, expressed in degrees Kelvin, are selected in such a way that the empirical equation:

$$K = 279.8 e^{-(0.1548A + 0.1075G + 0.001512T)} - 50$$

possesses a K value of 15 or less, preferably less than 10. In the equation, $e$ is the base of naperian logarithms, namely 2.71828 . . .

A series of experiments has proved that the value of K is, in first approximation, equal to the percentage of total carbon monoxide changed into carbon dioxide, under synthesis conditions. The value of K for any given A, G and T indicates to what extent such a conversion of carbon monoxide to carbon dioxide takes place; negative values of K show the extent to which the reverse process, namely, a conversion of carbon dioxide to carbon monoxide, is occurring.

Stated in another way:

$$\log_e (K+50) = -0.1548A - 0.1075G - 0.001512T + \log_e 279.8$$

where K, A, G and T have the same meanings as defined above, and A, G and T have to be selected so as to lead to values of K smaller than 15, preferably smaller than 10.

For example, with a feed gas composition and a reaction temperature corresponding to a K value of 15, the net carbon dioxide production will approximate 15 per cent on the basis of the carbon monoxide supplied to the reactor. Similarly when the fed gas composition and temperature conform to a K value of 10, the net production of carbon dioxide will be about 10 per cent, on the same basis. It is usually preferred, however, to operate under conditions where the value of K is below about 5 whereby the net production of carbon dioxide is restricted to a corresponding low value. It is to be understood that the foregoing specific results contemplate maintenance of a reasonably uniform temperature throughout the catalyst, with elimination of localized hot spots; and high consumption of the carbon monoxide fed to the reactor, preferably substantially above 90 per cent. With a decrease in percentage conversion of carbon monoxide or substantial temperature variation, the net production of carbon dioxide usually tends to increase somewhat above the optimum above indicated.

When it is desired to effect actual consumption of carbon dioxide supplied in the feed gas, conditions of temperature and feed gas composition are employed such that K in the foregoing equation has a predetermined negative value. Negative values of K indicate the relative magnitude of the actual net consumption of carbon dioxide, the consumption of carbon dioxide being expressed as a per cent of the carbon monoxide fed to the reactor. Expressing the carbon dioxide in this way permits using the same general formula.

Obviously this embodiment of the invention is of particular advantage in situations where a source of carbon dioxide is available in addition to the carbon monoxide and hydrogen which comprises the typical synthesis gas.

It is important to note that the foregoing relationships are effective for optimum results when the feed gas comprises from about 8 to about 26 mol per cent of carbon monoxide, based upon the total mols of carbon monoxide, carbon dioxide and hydrogen present in the feed gas, and particularly where the value of A is in the range between about 2 and about 6.5, more advantageously between the values of about 3 and about 5.5, and also wherein the value of G is within the broad range from about 1 to about 5, and advantageously within the preferred range of about 2 to about 4. In other words, where the constituents of the total feed gas fall within the foregoing ranges, the present invention affords a reasonably precise basis for controlling the extent of carbon dioxide formation.

Usually the value of A will be greater than 2.5, and the value of G will be greater than 1.5 unless the value of A is substantially above the minimum. However, as clearly established by the empirical equation, increase in the value of G may permit a decrease in the value of A or vice versa where equivalent results are desired.

Maximum production of liquid hydrocarbons boiling in approximately the motor gasoline boiling range, usually is realized with an operating temperature in the range of about 600–650° F., and broadly, from about 550–700° F., depending upon the particular catalyst employed, and the other conditions of operation. For example, with a typical iron catalyst promoted with minor quantities of alumina and potassium oxide, a good operating temperature may be about 625° F. under a pressure of about 200 pounds per square inch gauge.

It is, of course, to be understood that, with the same catalyst, the lighter hydrocarbons down to and including the normally gaseous hydrocarbons may be selectively and predominantly produced at somewhat higher temperatures, whereas the higher boiling hydrocarbon fractions tend to form the major portion of the hydrocarbon product in the lower portions of the foregoing broad temperature range. Lower pressures tend to enhance the production of the gaseous hydrocarbons.

The catalyst may comprise granular or powdered iron suitably arranged in heat transfer relationship to appropriate cooling surfaces adapted to hold the operating temperature at the desired value. The catalyst advantageously contains any of the typical activators or promoters such as an oxide of an alkali metal, and in addition may contain an oxide of alkaline earth metals, zirconium, thorium, aluminum, and many others hitherto suggested. The catalyst may be in the supported or unsupported form as desired, although an unsupported type of catalyst is generally preferred. In the supported form, the catalyst may comprise iron, suitably reduced and conditioned, together with the promoter, carried upon silica gel, Filter Cel, diatomaceous earth, or the like.

It is particularly advantageous to employ the catalyst in fluidized condition with the particles of catalyst "aerated" or buoyed up, in the stream of upflowing reactants, in a state of random, vibratory motion conducive to good heat transfer, and temperature uniformity throughout the mass. The catalyst, in such case, is usually relatively fine, as for example, below 100 or 200 mesh in size, or any other appropriate particle size permitting maintenance of a fluid phase by the reactant flow.

Following this technique, and with conditions appropriate to hold the catalyst throughout the reaction zone in a uniform state of dense phase fluidization, it is possible to maintain any predetermined temperature with insignificant variation, throughout the reaction zone, and to secure adequate contact between the reactants and the catalyst for any desired time.

The total feed gases supplied to the reaction zone in carrying out the present invention may be derived from any suitable source. In typical instances, the hydrogen and carbon monoxide are derived as a result of the gasification of coal, coke, or other carbonaceous matter, or the partial combustion of hydrocarbons, such as natural gas or even liquid hydrocarbon materials. While carbon dioxide may likewise occur in such processes, additional requirements can be met with extraneous carbon dioxide from any source. One convenient source is the so-called tail gas from the present process or similar processes, which may be recovered and recycled in appropriate ratio with respect to the hydrogen and carbon monoxide feed gases to meet the requirements of the foregoing equation. If desirable, or necessary, the tail gases may be conducted through any suitable gas recovery plant whereby a concentrated carbon dioxide stream is made available for recycle.

As stated above, it is important in handling the recycle stream as well as the other reactant streams, to keep water vapor at a low and preferably insignificant level. Thus, the tail gases may be recovered by passing the gasiform effluent product through a condenser and separator to remove all of the normally liquid constituents. With condensation and separation at temperatures below 100° F. and a pressure of 250 pounds per square inch gauge, the water vapor content will be reduced to an inconsequential value, for example, about 0.36 mol per cent. A material increase in the water concentration, above 1.0 per cent, for example, results in an increased tendency toward net carbon dioxide formation. The residual overhead gases from the separation step constitute the tail gas stream referred to above which may be recycled either before or after removal of undesired normally gaseous constituents.

It is usually desirable from the standpoint of good utilization of available equipment, to limit, in so far as feasible, the proportion of other gaseous constituents in the total feed.

By way of example, feed gas containing carbon monoxide, hydrogen and carbon dioxide, and less than 0.1 per cent of water vapor, is heated to conversion temperature, and passed at a pressure of from 205 to 250 pounds per square inch gauge in contact with a fluidized iron catalyst of 60 to 400 mesh size, promoted with small amounts of alkali and alumina, in a reaction zone maintained at the temperatures shown in the following table. The table summarizes seven separate runs, showing the mol per cent of carbon monoxide in the feed gases, and the relative proportions of hydrogen and carbon dioxide to the carbon monoxide. The table also shows the approximate agreement of the calculated value of K, on the basis of the feed gas compositions and temperature, with the respective values of carbon dioxide production or consumption, as the case may be. Moreover, it gives in each case the percentage yield of hydrocarbons having at least three carbon atoms, on the basis of the carbon monoxide fed to the reactor.

*Examples*

|  | 1 | 2 | 3 | 4 | 5 | 6 | 7 |
|---|---|---|---|---|---|---|---|
| CO mol percent in total feed gas passing to the reactor | 11.3 | 16.8 | 14.7 | 31.7 | 5.3 | 12.2 | 12.2 |
| A($H_2$/CO) | 3.21 | 3.12 | 1.27 | 1.86 | 3.83 | 3.05 | 3.05 |
| G($CO_2$/CO) | 2.27 | 1.26 | 2.14 | 0.29 | 5.04 | 2.12 | 2.12 |
| Temp. °F | 643 | 645 | 638 | 650 | 618 | 505 | 679 |
| K | 2.82 | 9.60 | 22.63 | 30.07 | -13.61 | 11.79 | 3.39 |
| $CO_2$ Production of Consumption as percent of total CO charged | 3.78 | 11.9 | 21.3 | 27.3 | -11.1 | 12.4 | 2.97 |
| Yield $C_3$ and higher hydrocarbons basis percent of total CO charged | 73.1 | 59.3 | 40.1 | 54.1 | 87.6 | 58.1 | 78.2 |

Comparison of second example with the first shows that with a decrease in the ratio of carbon dioxide to carbon monoxide (G) in the feed gas, all other variables remaining essentially the same, there is a material increase in the net production of carbon dioxide. The third example, contrasted with the first, shows that operation with a lower ratio of hydrogen to carbon monoxide (A), such that K in the foregoing equation is outside the purview of the present invention, the production of carbon dioxide is excessive, and the yield of $C_3$ and higher hydrocarbons is low. The fourth example also shows excessive production of carbon dioxide and low yield of hydrocarbons, with low values of both A and G such that K is substantially above 15. Actual consumption of carbon dioxide is shown in the fifth example. The sixth and seventh examples serve to compare the general effect of variation in the reaction temperature.

It should be understood that the hydrocarbon yield referred to in the foregoing table includes small proportions of oxygenated hydrocarbons.

From the foregoing, it is apparent that the present invention provides an effective means for suppressing the net production of carbon dioxide to low levels below 15 per cent and preferably below 10 per cent and, in the optimum preferred operation hereunder, not greater than 5 per cent on the basis of the carbon monoxide consumed. This is accomplished without adversely affecting the product distribution to any material extent, and results in a corresponding overall increase in hydrocarbon production. It may, moreover, be accomplished without great regard to the specific type of hydrocarbon product which it is desired to produce.

In general, a change in the specific iron catalyst employed, the operating pressure, or the contact time, within reasonable limits, will cause only minor variation in desired results.

The invention may be applied to operations wherein the feed gas is contacted with the catalyst in either a single stage, or in a plurality of series stages, with or without interstage condensation or removal of water vapor and/or hydrocarbon porducts. In general, the intermediate removal of water vapor between stages is beneficial.

Obviously many modifications and variations of the invention as hereinbefore set forth may be made without departing from the spirit and scope thereof, and therefore only such limitations should be imposed as are indicated in the appended claims.

We claim:

1. In the production of hydrocarbons, oxygenated hydrocarbons and the like, wherein reactant gas containing hydrogen, carbon monoxide and carbon dioxide is passed in contact with an iron synthesis catalyst in a reaction zone maintained under a temperature of from about 500 to about 750° F. and a superatmospheric pressure effective to cause consumption of, at least, about 80% of the carbon monoxide supplied, with formation of desired products of reaction, and the products of reaction are recovered, the improvement wherein the total stream of reactant gas supplied as a feed for passage in contact with the synthesis catalyst contains more than about 15 mol per cent of carbon monoxide and contains less than about 2 mol per cent water vapor based on the total mols of carbon monoxide, hydrogen and carbon dioxide present and is in conformance with the following equation:

$$\log_e (K+50) = -0.1548A - 0.1075G - 0.001512T + \log_e 279.8$$

where:

K is less than 15;

$e$ is the naperian logarithmic base, 2.71828...;

A is equal to the ratio of the mols of hydrogen to the mols of carbon monoxide in the feed gas to the reaction zone;

G is the ratio of the mols of carbon dioxide to the mols of carbon monoxide in the feed gas to the reaction zone; and T is the absolute temperature of the synthesis reaction in degrees Kelvin;

and separating products of reaction from the effluent gases.

2. The method as defined in claim 1 wherein the value of K is below about 10.

3. The method as defined in claim 1 wherein the value of K is below about 5.

4. The process according to claim 1, wherein the mixture of reactant gas supplied in contact with the catalyst contains not above 1.0 mol per cent water vapor.

5. The process according to claim 1, wherein the mixture of reactant gas supplied in contact with the catalyst contains water vapor in an amount not greater than that corresponding to saturation at 100° F.

6. The method as defined in claim 1 wherein the said gas contains not more than about 26 mol percent carbon monoxide based on the total content of carbon monoxide, hydrogen and carbon dioxide and wherein the value of A is not less than about 2.

7. The method according to claim 1 wherein the value of A is not less than about 1.

8. In the production of hydrocarbons, oxygenated hydrocarbons and the like, wherein reactant gas containing hydrogen, carbon monoxide and carbon dioxide is passed in contact with an iron synthesis catalyst in a reaction zone maintained under a temperature from about 500 to about 750° F. and a superatmospheric pressure effective to cause consumption of, at least, about 80% of the carbon monoxide supplied, with formation of desired products of reaction, and the products of reaction are recovered, the improvement which comprises maintaining the carbon monoxide content of said reactant gas greater than about 15 mol percent, and maintaining the water vapor content of the mixture lower than 2 mol percent, based on the total mols of carbon monoxide, hydrogen and carbon dioxide present and the relative molar proportions of hydrogen, carbon monoxide and carbon dioxide in conformance with the following equation:

$$\log_e (K+50) = -0.1548A - 0.1075G - 0.001512T + \log_e 279.3$$

where:

K is a negative number;
e is the naperian logarithmic base, 2.71828...;
A is equal to the ratio of the mols of hydrogen to the mols of carbon monoxide in the feed gas to the reaction zone;
G is the ratio of the mols of carbon dioxide to the mols of carbon monoxide in the feed gas to the reaction zone; and
T is the absolute temperature of the synthesis reaction in degrees Kelvin;

and separating products of reaction from the effluent gases.

9. The process according to claim 8, wherein the mixture of reactant gas supplied in contact with the catalyst contains not above 1.0 mol percent water vapor.

10. The process according to claim 8, wherein the mixture of reactant gas supplied in contact with the catalyst contains water vapor in an amount not greater than that corresponding to saturation at 100° F.

11. The method as defined in claim 8 wherein the said gas contains not more than about 26 mol percent carbon monoxide based on the total content of carbon monoxide, hydrogen and carbon dioxide and wherein the value of A is not less than about 2.

12. The method according to claim 8 wherein the value of A is not less than about 1.

WALTER G. FRANKENBURG.
EDWIN T. LAYNG.

REFERENCES CITED

The following references are of record in the file of this patent:

UNITED STATES PATENTS

| Number | Name | Date |
| --- | --- | --- |
| 2,231,990 | Dreyfus | Feb. 18, 1941 |
| 2,436,957 | Eastman | Mar. 2, 1948 |
| 2,461,570 | Roberts | Feb. 15, 1949 |
| 2,486,879 | Rees et al. | Nov. 1, 1949 |
| 2,486,895 | Watson | Nov. 1, 1949 |
| 2,498,838 | Griffin | Feb. 28, 1950 |
| 2,510,096 | Frankenburg et al. | June 6, 1950 |